US011682232B2

United States Patent
Park et al.

(10) Patent No.: US 11,682,232 B2
(45) Date of Patent: Jun. 20, 2023

(54) DEVICE AND METHOD WITH IMAGE MATCHING

(71) Applicant: SAMSUNG ELECTRONICS CO., LTD., Suwon-si (KR)

(72) Inventors: Sungun Park, Suwon-si (KR); Jihye Kim, Anyang-si (KR); Jaejoon Han, Seoul (KR); Minsu Ko, Suwon-si (KR); Seungju Han, Seoul (KR); Jinwoo Son, Seoul (KR); Changyong Son, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 16/148,129

(22) Filed: Oct. 1, 2018

(65) Prior Publication Data

US 2019/0251237 A1    Aug. 15, 2019

(30) Foreign Application Priority Data

Feb. 12, 2018    (KR) .......................... 10-2018-0017303

(51) Int. Cl.
*G06F 21/00*    (2013.01)
*G06V 40/16*    (2022.01)
(Continued)

(52) U.S. Cl.
CPC ........ *G06V 40/172* (2022.01); *G06F 16/5838* (2019.01); *G06F 18/22* (2023.01);
(Continued)

(58) Field of Classification Search
CPC .... G06F 21/32; G06F 17/30256; G06F 21/45; G06F 21/30; G06F 21/44; G06K 9/6215;
(Continued)

(56) References Cited

U.S. PATENT DOCUMENTS 8,457,367 B1 *   6/2013   Sipe .................. G06K 9/00315
                                                         382/118
9,692,991 B2    6/2017   Zhang et al.
(Continued)

FOREIGN PATENT DOCUMENTS

JP          2008-511080 A      4/2008
KR          10-0897542 B1      5/2009
(Continued)

OTHER PUBLICATIONS

Sun, L., et al., "TIR/VIS correlation for liveness detection in face recognition." *International Conference on Computer Analysis of Images and Patterns*. Springer, Berlin, Heidelberg, 2011, p. 114-121 (8 pages in English).
(Continued)

*Primary Examiner* — Jeffrey C Pwu
*Assistant Examiner* — Helai Salehi
(74) *Attorney, Agent, or Firm* — NSIP Law

(57) ABSTRACT

An image matching method includes extracting, from a first image of an object, a landmark patch including a landmark point of the object; extracting, from a second image of the object, a target patch corresponding to the landmark patch; and determining a target point in the second image corresponding to the landmark point based on a matching between the landmark patch and the target patch.

23 Claims, 10 Drawing Sheets

(51) Int. Cl.
*G06F 21/32* (2013.01)
*G06T 7/73* (2017.01)
*G06F 16/583* (2019.01)
*G06V 40/40* (2022.01)
*G06F 18/22* (2023.01)
*H04N 23/90* (2023.01)
*G06V 10/75* (2022.01)

(52) U.S. Cl.
CPC ............... *G06F 21/32* (2013.01); *G06T 7/74* (2017.01); *G06V 40/45* (2022.01); *H04N 23/90* (2023.01); *G06T 2207/10024* (2013.01); *G06T 2207/10048* (2013.01); *G06T 2207/20024* (2013.01); *G06T 2207/20081* (2013.01); *G06T 2207/20084* (2013.01); *G06V 10/759* (2022.01); *G06V 40/165* (2022.01); *G06V 40/171* (2022.01)

(58) Field of Classification Search
CPC .... G06K 9/46; G06K 9/00906; G06K 9/2054; G06K 9/6202; G06K 9/00281; G06K 9/00248; G06T 7/74; G06T 2207/20024; G06T 2207/10024; G06T 2207/10048; G06T 2207/20084; G06T 2207/20081; H04N 5/247
See application file for complete search history.

(56) References Cited

U.S. PATENT DOCUMENTS

| | | |
|---|---|---|
| 2010/0290703 A1 | 11/2010 | Sim et al. |
| 2016/0019420 A1* | 1/2016 | Feng ............... G06K 9/00906 382/117 |
| 2016/0379050 A1* | 12/2016 | Tian ............... G06K 9/00288 382/118 |
| 2017/0091550 A1* | 3/2017 | Feng .................. G06T 7/38 |
| 2018/0196997 A1* | 7/2018 | Price ................. H04N 13/239 |

FOREIGN PATENT DOCUMENTS

| | | |
|---|---|---|
| KR | 10-1051716 B1 | 7/2011 |
| KR | 10-1562150 B1 | 10/2015 |
| KR | 10-1697512 B1 | 1/2017 |
| KR | 10-1797028 B1 | 11/2017 |

OTHER PUBLICATIONS

Sun, X et al., "Multispectral face spoofing detection using VIS-NIR imaging correlation." *International Journal of Wavelets, Multiresolution and Information Processing*, vol. 16, No. 02, 2018, p. 1-15 (15 pages in English).

Extended European Search Report dated Jul. 16, 2019 in Corresponding European Patent Application No. 19156598.5 (10 pages in English).

* cited by examiner

DEVICE AND METHOD WITH IMAGE MATCHING

CROSS-REFERENCE TO RELATED APPLICATIONS

This application claims the benefit under 35 USC § 119(a) of Korean Patent Application No. 10-2018-0017303 filed on Feb. 12, 2018 in the Korean Intellectual Property Office, the entire disclosure of which is incorporated herein by reference for all purposes.

BACKGROUND

1. Field

The following description relates to an image matching technology.

2. Description of Related Art

Recently, the importance of security authentication has been increasing as a result of the ongoing development of various mobile devices and wearable devices, such as smartphones. An authentication technology using biometrics authenticates a user using a fingerprint, an iris, a voice, a face, a blood vessel, etc. Biological properties used for authentication are unique to a person, are convenient to carry, and remain stable for the life of the person. Also, biological properties are difficult to appropriate or counterfeit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image matching method including: extracting, from a first image of an object, a landmark patch including a landmark point of the object; extracting, from a second image of the object, a target patch corresponding to the landmark patch; and determining a target point in the second image corresponding to the landmark point based on a matching between the landmark patch and the target patch.

The method may further include acquiring, using a color image sensor, a color image as the first image; and acquiring, using an infrared (IR) image sensor, an IR image as the second image.

The method may further include determining, based on the target point, whether the object is an anatomical structure of a user.

The method may further include allowing access, through a user interface of a device, to one or more features of the device in response to the object being determined to be a live anatomical structure and/or a recognized user.

The extracting of the target patch may include determining the target patch in the second image based on a location of the landmark patch in the first image.

The extracting of the target patch may include extracting the target patch in response to the landmark point being detected in a determined region of the first image.

The extracting of the target patch may include determining the determined region based on a difference between a field of view (FOV) of a first image sensor used to capture the first image and an FOV of a second image sensor used to capture the second image.

The determining of the target point may include retrieving, from the target patch, a partial region that matches the landmark patch; and determining a center point of the retrieved partial region as the target point.

The retrieving of the partial region may include calculating a similarity level between the landmark patch and each of a plurality of partial regions of the target patch; and determining a partial region with a highest calculated similarity level among the plurality of partial regions as the partial region that matches the landmark patch.

The calculating of the similarity level may include calculating a correlation level between values of pixels included in each of the plurality of partial regions of the target patch and pixels included in the landmark patch as the similarity level.

The first image may be a color image and the second image may be an infrared (IR) image; and the extracting of the landmark patch comprises: selecting a channel image from the first image; and extracting the landmark patch from the selected channel image.

The first image may include a plurality of channel images; and the extracting of the landmark patch may include extracting the landmark patch from a channel image with a minimum wavelength difference between the channel image and the second image among the plurality of channel images.

The extracting of the landmark patch may include extracting the landmark patch from the first image for each of a plurality of landmarks of the object, the extracting of the target patch may include extracting the target patch from the second image for each of the plurality of landmarks, and the determining of the target point may include determining the target point corresponding to the landmark point for each of the plurality of landmarks.

The extracting of the landmark patch may include determining an object region corresponding to the object in the first image; identifying the landmark point of the object in the object region; and extracting the landmark patch including the identified landmark point.

The method may further include matching the first image and the second image based on the landmark point of the first image and the target point of the second image.

The method may further include preprocessing the landmark patch and the target patch using a Gaussian filter; and matching the preprocessed landmark patch and the preprocessed target patch.

The extracting of the target patch may include determining the target patch in the second image based on a location of the landmark patch in the first image and a distance between an image matching device and the object.

The method may further include determining a point corresponding to a remaining landmark in the second image based on the target point associated with one of a plurality of landmarks of the object in response to the plurality of landmarks of the object being detected in the first image.

The method may further include recognizing an object present in the second image based on the target point.

The method may further include verifying a liveness of the object present in the second image based on the target point.

A non-transitory computer-readable storage medium may store instructions that, when executed by a processor, cause the processor to perform the method.

In another general aspect, there is provided an image matching device including: one or more processors configured to: obtain a first image of an object and a second image of the object; extract, from the first image, a landmark patch including a landmark point of the object, extract, from the second image, a target patch corresponding to the landmark patch, and determine a target point in the second image corresponding to the landmark point based on a matching between the landmark patch and the target patch.

The device may further include one or more image sensors configured to acquire the first image and the second image for the obtaining of the first image and the second image.

In another general aspect, there is provided an image matching method including: extracting, from a first image of an object, a first patch including a first feature point of the object; extracting, from a second image of the object, a second patch based on the first patch; determining a second feature point in the second patch; and identifying the object or verifying an identity of the object based on the second feature point and the second image.

Other features and aspects will be apparent from the following detailed description, the drawings, and the claims. Additional aspects will be set forth in part in the description which follows and, in part, will be apparent from the description, or may be learned by practice of the presented embodiments.

Figure 1:
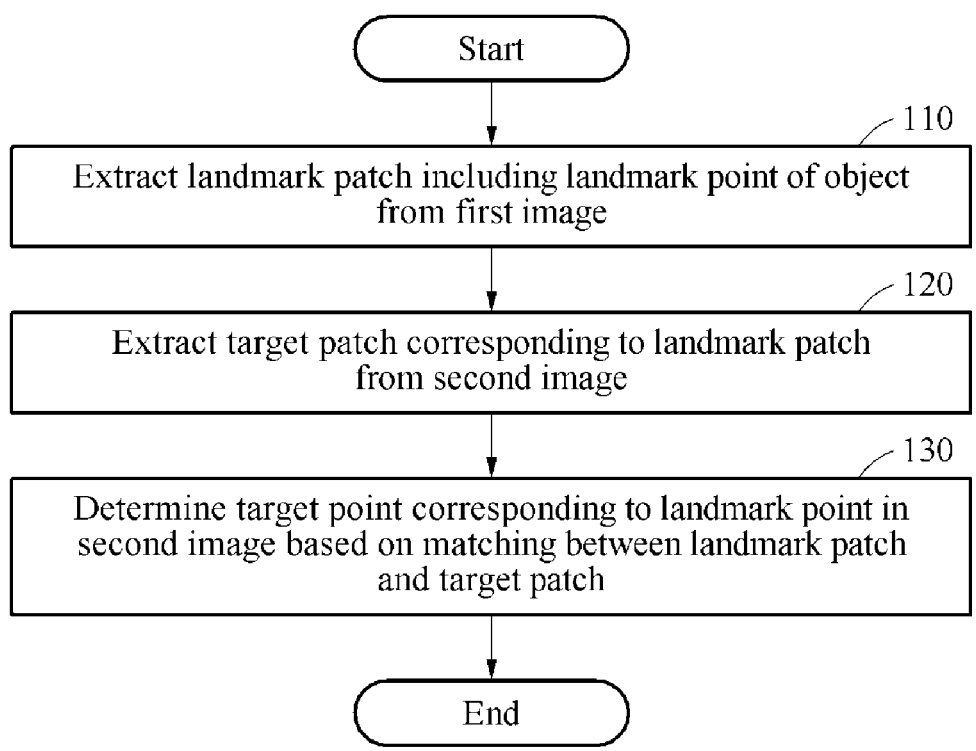
FIGS. 1 and 2 are flowcharts illustrating examples of an image matching method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, however, are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, devices, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains and in view of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of embodiments, detailed description of well-known related structures or functions will be omitted when it is deemed that such description will cause ambiguous interpretation of the disclosure.

Figure 2:
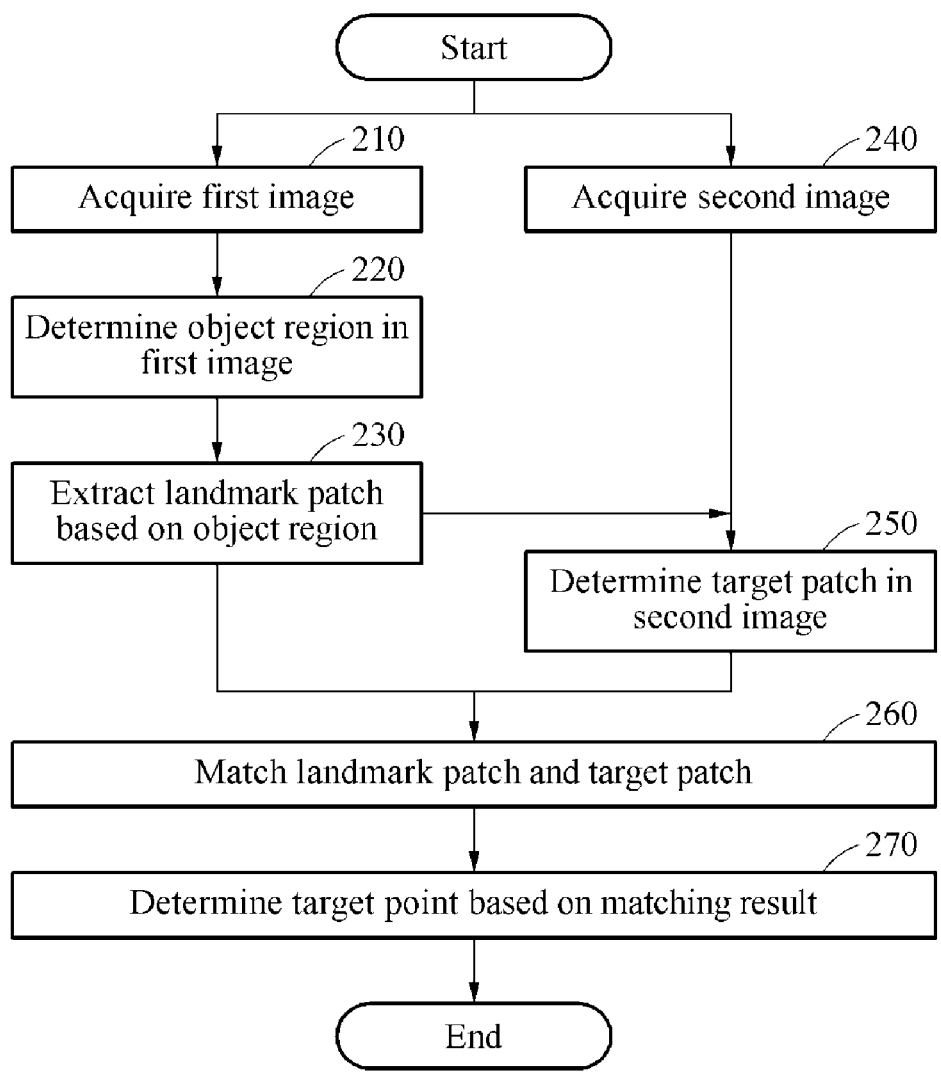

FIGS. 1 and 2 are flowcharts illustrating examples of an image matching method.

FIG. 1 is a flowchart illustrating an example of an image matching method.

Referring to FIG. 1, in operation 110, an image matching device extracts a landmark patch including a landmark point of an object from a first image. The first image refers to an image captured by a first image sensor. For example, the first image may be a color image. However, the first image is not limited thereto. Also, the first image may be a black-and-white image and/or a depth image.

The color image includes a plurality of color channel images. A color channel image may represent an intensity at which light with a wavelength band corresponding to a corresponding color is acquired by the first image sensor, for example, a color sensor. For example, the color image includes a red channel image, a green channel image, and a blue channel image. The red channel image represents an intensity at which light with a wavelength band corresponding to a red color is received. The green channel image represents an intensity at which light with a wavelength band corresponding to a green color is received. The blue channel image represents an intensity at which light with a wavelength band corresponding to a blue color is received.

The depth image refers to an image captured by the first image sensor, for example, a depth sensor. Each pixel of the depth image has a value indicating a distance between a corresponding pixel and a point corresponding to the pixel. The depth sensor may include a sensor based on a time-of-flight (ToF) scheme, a sensor based on a structured light scheme, and the like. However, the depth sensor is not limited thereto.

Herein, the term "landmark" may represent a desired part with respect to the object. For example, if the object is a face of a human, the landmark may be an eye, a nose, a mouth, an eye brow, lips, a pupil, and the like. Also, the term "landmark point" may refer to a feature point that represents each feature of the object. For example, the landmark point may be used to indicate both ends of one eye, a center of the eye, both ends of the mouth, a tip of the nose, and the like. However, the landmark point is not limited thereto. The term "landmark patch" may refer to an image patch that includes the landmark point in the first image. The term "image patch" may refer to a subgroup of pixels of an image or a cropped or processed portion of the image.

In operation 120, the image matching device extracts a target patch corresponding to the landmark patch from a second image. The second image refers to an image captured by a second image sensor. For example, the second image may be an infrared (IR) image. However, the second image is not limited thereto.

The target patch may be an image patch that includes a point corresponding to a location of the landmark patch. The image matching device coarsely determines a location in the second image corresponding to the location of the landmark point or the location of the landmark patch in the first image. The image matching device extracts the target patch with a size greater than a size of the landmark patch. An operation of determining the target patch will be further described below.

Herein, the image patch may refer to a set of pixels of a partial region in an entire image. For example, the landmark patch may be a set of pixels of a partial region in the first image. The target patch may be a set of pixels of a partial region in the second image.

An image type of the first image and an image type of the second image may be different. For example, the first image may be a color image, and the second image may be an IR image. The first image may be an IR image, and the second image may be a color image. The first image may be a depth image, and the second image may be an IR image. The first image may be an IR image, and the second image may be a depth image. However, the image type of each of the first image and the second image is not limited thereto. The image type of the first image and the image type of the second image may be identical. Both the first image and the second image may be color images. Both the first image and the second image may be IR images. The image type of the first image and the image type of the second image may be classified, for example, based on a wavelength of light that may be received by each of the first image sensor and the second image sensor configured to capture the respective corresponding images. A first wavelength band image of light receivable by the first image sensor and a second wavelength band of light receivable by the second image sensor may be different. Although a description is made herein using a color image and an IR image as an image type, they are provided as examples only. For convenience of description, the following description is made based on an example in which the color image is used as the first image and the IR image is used as the second image. However, the first image and the second image are not limited thereto.

In operation 130, the image matching device determines a target point corresponding to the landmark point in the second image based on a matching between the landmark patch and the target patch. The image matching device retrieves a partial region that matches the landmark patch from the target patch. For example, the image matching device may divide the target patch into a plurality of partial regions and may select a partial region that is most similar to the landmark patch from the plurality of partial regions. The image matching device may determine a point of the partial region selected from the second image, for example, a center point, as the target point corresponding to the landmark point in the first image.

The image matching device may adjust the target patch and the landmark patch at an identical resolution by performing scaling on at least one of the target patch and the landmark patch, and may perform a patch matching. For example, the image matching device may generate a plurality of partial regions by dividing the target patch into windows each with a desired size. The image matching device may perform scaling on at least one of the partial regions and the landmark so that a size, a resolution, and a number of pixels of the partial region may become identical to a size, a resolution, and a number of pixels of the landmark patch, respectively.

Thus, the image matching device may efficiently determine a feature point with respect to the second image using a feature point identified in the first image without additionally extracting the feature point from the second image.

FIG. 2 is a flowchart illustrating an image matching method.

Referring to FIG. 2, in operation 210, an image matching device acquires a first image. For example, the image matching device may acquire the first image by photographing or capturing an object using a first image sensor.

In operation 220, the image matching device determines an object region in the first image. In an example, the image matching device may determine the object region corresponding to the object in the first image based on an object model. The object model may be a model that is configured or trained to output a region corresponding to an object from an input image and, for example, may be a trained neural network.

The neural network represents a recognition model using a large number of nodes that may be connected by edges, e.g., by weighted connections, and/or that may apply trained kernels, e.g., in implemented convolutional operations. The neural network is implemented through hardware or a combination of hardware and instructions, e.g., through instructions stored in a non-transitory memory of the image matching device, which when executed by one or more processors of the image matching device, cause the one or more processors to implement the recognition model. The recognition model may be trained in the memory of the image matching device in various structures. The various data structures may include storing the resulting trained parameters, e.g., including the trained connection weights and/or kernels, in vector, matrix, volume, or other single or multi-dimensional data structure. Also, though the recognition model is discussed using the example neural network structure, alternate machine learning structures may also be available in other examples.

In operation 230, the image matching device extracts a landmark patch based on the object region. In an example, the image matching device may identify a landmark point of the object in the object region. For example, the image matching device may determine the landmark point in the object region based on a landmark model. The landmark model may be a model that outputs the landmark point from the object region and, for example, may also be a trained neural network, as a non-limiting example, trained for the landmark patch extraction objective. The image matching device may extract the landmark patch that includes the identified landmark point. For example, the image matching device may extract, as the landmark patch, an image patch using the landmark point as a center point.

In operation 240, the image matching device acquires a second image. For example, the image matching device acquires the second image by photographing the object using a second image sensor. A point in time at which the first image is captured and a point in time at which the second image is captured may be different. For example, the image matching device may acquire the first image and the second image at different timings, respectively. Also, the image matching device may simultaneously acquire the first image and the second image. Also, the image matching device may adjust scales between two images based on their respective fields of view (FOVs) and a relative locational difference between the first image sensor and the second image sensor, as non-limiting examples.

In operation 250, the image matching device determines a target patch in the second image. The image matching device may determine the target patch in the second image based on a location of the landmark patch in the first image. Also, the image matching device may determine the target patch in the second image based on the location of the landmark patch in the first image and a distance between the object and the image matching device. For example, the image matching device may determine, as the target patch, an image patch in the second image that is mapped with respect to the location of the landmark patch in the first image. The image matching device may estimate a region in which a feature point corresponding to the landmark is expected to be present in the second image, based on the location of the landmark patch in the first image.

Also, the image matching device extracts the target patch in response to the landmark point being extracted from a desired region (e.g., a determined region) of the first image. The image matching device determines the desired region based on a disposition between the first image sensor capturing the first image and the second image sensor capturing the second image, a FOV of the first image sensor, and a FOV the second image sensor. For example, the image matching device may determine a region corresponding to the FOV of the second image sensor in the first image as the desired image based on a separate distance between the first image sensor and the second image sensor and a distance between the object and the image matching device. The distance between the object and the image matching device may be a predetermined (or, alternatively, desired) distance, for example, 15 cm to 30 cm. For example, the image matching device may measure a distance from the object using a depth sensor or estimate the distance from the object using a disparity between a left image and a right image acquired by a stereo camera.

The image matching device terminates an image matching operation in response to a failure in identifying the landmark point. Also, the image matching device terminates the image matching operation in response to the landmark point identified in the first image being absent in the desired region.

In operation 260, the image matching device matches the landmark patch and the target patch. The image matching device retrieves a partial region that matches the landmark patch from the target patch. An example of retrieving the partial region that matches the landmark patch will be further described with reference to FIG. 5.

In operation 270, the image matching device determines a target point based on an image matching result. For example, the image matching device determines a center point of the retrieved partial region as the target point. As described above, the first image and the second image may be acquired at different timings, respectively. Thus, a form, a location, and a pose of the object present in the first image may be different from those of the object present in the second image. In an example, the image matching device may accurately match images captured at different points in times by matching the first image and the second image based on the landmark.

Figure 3:
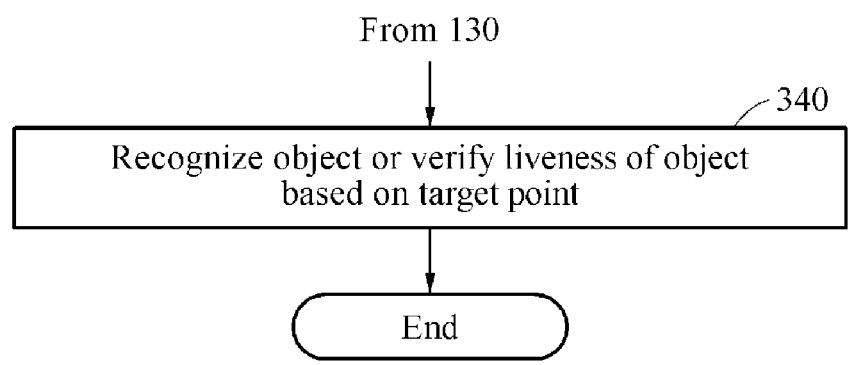
FIG. 3 is a flowchart illustrating an example of an object recognition and a liveness verification based on a determined target point.

FIG. 3 is a flowchart illustrating an example of an object recognition and a liveness verification based on a determined target point.

Referring to FIG. 3, in operation 340, the image matching device recognizes the object or verifies a liveness of the object based on a target point. For example, the image matching device may recognize the object that is present in the second image based on a target point of the second image. As another example, the image matching device may verify an effectiveness of the liveness of the object that is present in the second image based on the target point of the second image.

Herein, the term "recognition" may include a verification and an identification. As non-limiting examples, the verification may represent an operation of determining whether input data is true or false, and the recognition may represent an operation of determining a label indicated by the input data among a plurality of labels.

The liveness represents whether the object is an actual living body and not a spoof attempt or fake/forged object. For example, the image matching device determines the liveness of the object based on a liveness parameter determined for each frame of at least one of the first image and the second image. The liveness parameter is used to determine whether each frame is based on an image that is effectively captured from an actual user. For example, the liveness parameter represents "true" if an image corresponding to a frame is captured from the actual user. The liveness parameter represents "false" if the image is forged. The image matching device may calculate the liveness parameter based on at least one of a feature point of the first image and a feature point of the second image.

Figure 4:
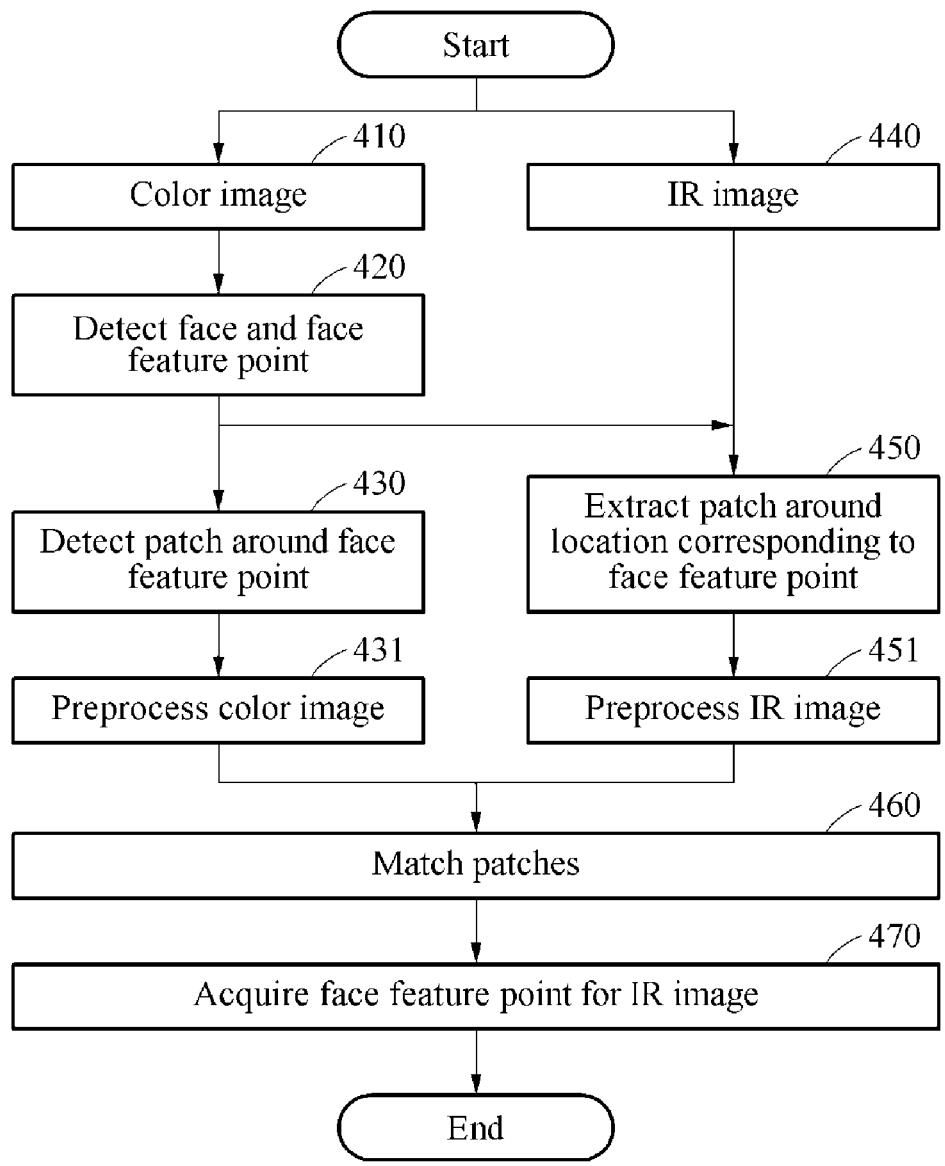
FIG. 4 is a flowchart illustrating an example of a method of matching a color image and an infrared (IR) image.

FIG. 4 is a flowchart illustrating an example of a method of matching a color image and an IR image.

In operation 410, an image matching device acquires a color image as a first image. In operation 440, the image matching device acquires an IR image as a second image. The image matching device may capture the color image and the IR image from an identical object. That is, the identical object may be included in both the color image and the IR image.

In operation 420, the image matching device detects a face and a face feature point. For example, the image matching device may detect a face region based on the color image. The image matching device may detect the face feature point in the face region.

In operation 430, the image matching device extracts a patch around the face feature point. For example, the image matching device may extract a landmark patch including the face feature point detected in operation 420.

In operation 450, the image matching device extracts a patch around a location corresponding to the face feature point. For example, the image matching device may extract a target patch from the IR image corresponding to the face feature point detected in operation 420.

In operation 431, the image matching device preprocesses the color image. In operation 451, the image matching device preprocesses the IR image. The image matching device may apply a Gaussian filter to the color image and the IR image. The Gaussian filter may output a magnitude of gradient with respect to pixels of an image. A pixel value of each pixel of the image to which the Gaussian filter is applied may represent a Gaussian magnitude. The color image to which the Gaussian filter is applied may be blurred. In the IR image to which the Gaussian filter is applied, an edge of the IR image may be emphasized. For example, the image matching device may preprocess the landmark patch and the target patch using the Gaussian filter. The image matching device may perform a morphology operation with respect to the IR image before the Gaussian filter is applied. The morphology operation may reduce an effect by speckles or spotlights occurring due to reflection by eyeglasses, which may be present in the IR image.

Although preprocessing operations in operations 431 and 451 of FIG. 4 are illustrated to be followed by operations 430 and 450, respectively, it is provided as an example only. The image matching device may perform the preprocessing operations before operations 430 and 450 and may also perform the preprocessing operations before detecting the face in operation 420.

In operation 460, the image matching device matches patches between two images, that is, the color image and the IR image. For example, the image matching device may determine a partial region of the target patch in the IR image that matches the landmark patch in the color image. The image matching device may match the preprocessed landmark patch and the preprocessed target patch.

In operation 470, the image matching device acquires the face feature point for the IR image. In an example, the image matching device may determine the face feature point with respect to the IR image based on the aforementioned matching between the landmark patch and the target patch. The image matching device may determine a point included in the determined partial region. For example, a center point of the partial region may be determined as a target point. The target point may be the face feature.

Thus, even though the IR image may be vulnerable to reflection by an accessory having a characteristic of total reflection, for example, eyeglasses (and therefore it may be difficult to accurately determine the feature point directly from the IR image), the image matching device may accurately determine the feature point with respect to the IR image by mapping the feature point extracted based on the color image with respect to the IR image.

Figure 5:
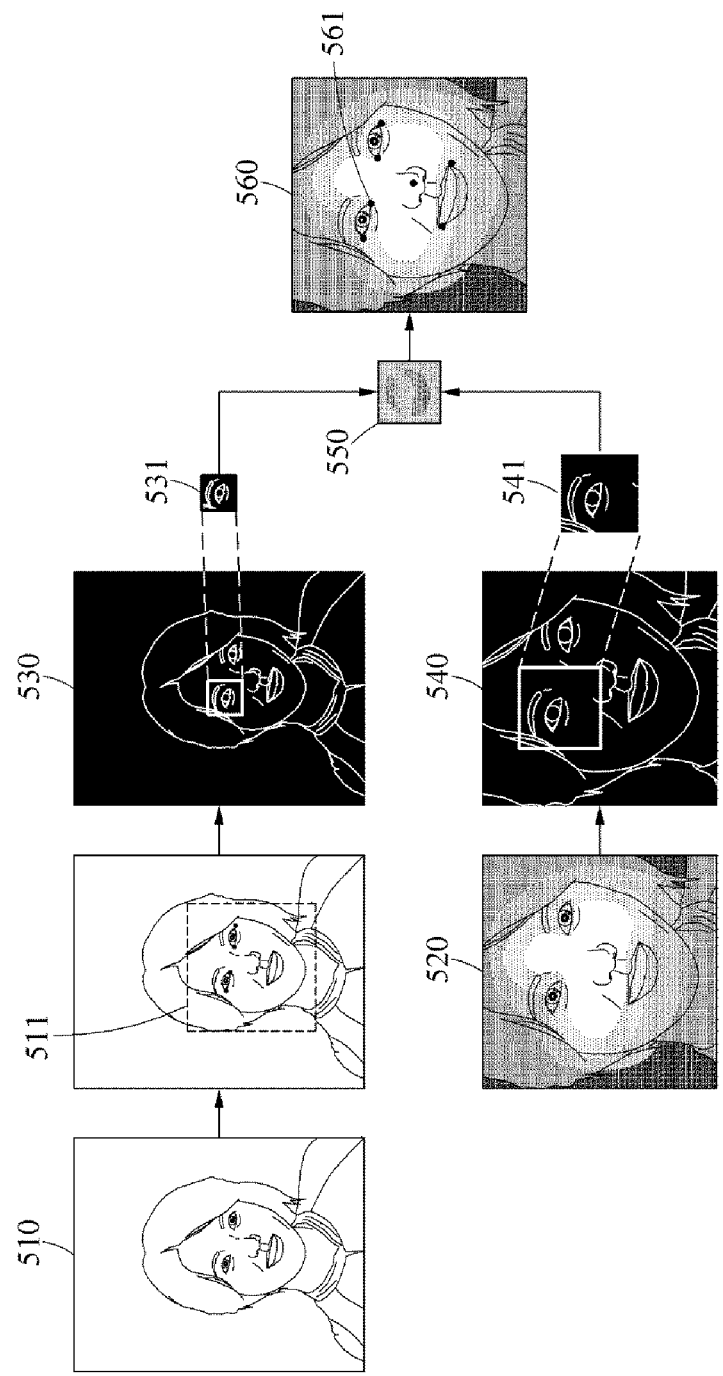
FIG. 5 illustrates an example of an image matching process and a feature point extraction.

FIG. 5 illustrates an example of an image matching process and a feature point extraction.

Although FIG. 5 illustrates an example in which a color image 510 is used as a first image and an IR image 520 is used as a second image, it is provided as an example only. For example, the first image may be an IR image, and the second image may be a color image. Both the first image and the second image may be IR images. Both the first image and the second image may be color images. Further, the first image may be a depth image, and the second image may be a color image. For example, the first image may be one of a color image, an IR image, and a depth image, and the second image may be one of a color image, an IR image, and a depth image.

An image matching device acquires the color image 510 as the first image. Referring to FIG. 5, a first image sensor of the image matching device generates the color image 510 by photographing a face of a human as an object.

The image matching device identifies a landmark point of the object with respect to the color image 510. For example, the image matching device extracts a feature point of the face of the human from the color image 510 based on an object model. In an example, the image matching device may determine whether the landmark point is identified in a predetermined (or, alternatively, desired) region 511. The landmark point is represented as a dot in FIG. 5. The region 511 in the color image 510 is a region corresponding to a FOV of the IR image 520. Thus, in response to the landmark point extracted from the color image 510 being absent in the region 511, a landmark of the object, for example, a nose of the face, may be absent in the IR image 520. In response to the landmark of the object being absent in the IR image 520, a landmark-based matching may not be performed. Thus, the image matching device terminates a matching operation.

The image matching device acquires the IR image 520 as the second image. A second image sensor of the image matching device generates the IR image 520 by photographing the face of the human as the object. The first image sensor may be a camera sensor, and the second image sensor may be an IR sensor. A FOV of the IR sensor may be narrower or wider than that of the camera sensor. The camera sensor acquires the color image in a visible band, and the IR sensor acquires the IR image in an IR band. Referring to FIG. 5, a ratio of the face in the IR image 520 is relatively great compared to the color image 510.

The first image that is acquired by the image matching device includes a plurality of color channel images. For example, the plurality of color channel images may include a red channel image, a green channel image, and a blue channel image. Also, the first image may include a brightness channel image, for example, a Y channel image, and a chrominance channel images, for example, a U channel image and a V channel image.

The image matching device extracts a landmark patch 531 from a channel image 530 of the plurality of color channel images with a minimum wavelength difference with respect to the second image in response to the first image including the plurality of the color channel images. For example, if the first image includes the red channel image, the green channel image, and the blue channel image, and the second image is the IR image 520, the color channel image with the minimum wavelength difference is the red channel image. Thus, the image matching device selects the red channel image from the first image as the channel image 530. The image matching device extracts the landmark patch 531 from the channel image 530. The channel image 530 may be a preprocessed color image, as shown in FIG. 5. Preprocessing of the color image 510 may be performed using, for example, a Gaussian filter.

The image matching device extracts a target patch 541 of a location corresponding to the landmark patch 531 of the color image 510 from the IR image 520. For example, the image matching device extracts the target patch 541 from a preprocessed IR image 540.

The image matching device retrieves a partial region that matches the landmark patch 531 from the target patch 541. The image matching device determines a center point of the retrieved partial region as a target point. For example, the image matching device may calculate a similarity level (for example, a correlation level) between the landmark patch 531 and each of a plurality of partial regions of the target patch 541. The image matching device may determine a partial region with a highest calculated similarity level (for example, correlation level) among the plurality of partial regions as a partial region that matches the landmark patch 531.

The image matching device calculates a similarity level between pixels included in each of the plurality of partial regions of the target patch 541 and pixels included in the landmark patch 531. The image matching device calculates the correlation level, for example, a cross-correlation score, as the similarity level. For example, the image matching device may calculate a normalized cross-correlation value as the cross-correlation score by performing a normalized cross-correlation operation with respect to two patches. Referring to FIG. 5, the image matching device calculates a patch 550 in which a partial region of the target patch 541 and the landmark patch 531 are cross-correlated. A statistical value, for example, an average value and a median value, with respect to pixel values of pixels included in the cross-correlated patch 550 may be determined as the correlation level.

To improve a calculation rate, the image matching device samples a portion of the target patch 541 and calculates a similarity level between the sampled portion and the landmark patch 531. For example, the similarity level may be a value corresponding to the correlation level.

The image matching device determines a target point 561 with respect to the IR image 520 based on a matching between the landmark patch 531 and the target patch 541. The target point 561 may represent a feature point of the object, for example, the face of the human, present in the IR image 520. The image matching device recognizes the object or verifies a liveness of the object based on a second IR image 560 in which the target point 561 is determined. The second IR image 560 may be the same image as the IR image 520 (but the second IR image 560 is not limited thereto, and the second IR image may be different from the IR image 520).

In an example, the image matching device may match a first image and a second image based on a landmark point of the first image and a target point of the second image. For example, the image matching device may match the landmark point and the target point by transforming at least one of the first image and the second image based on the landmark point of the first image and the target point of the second image. The image matching device may match the landmark point and the target point by applying, for example, transform, shift, and rotation, to at least one of the first image and the second image. With respect to remaining pixels excluding the feature points, for example, the landmark point and the target point, in the first image and the second image, matching may be performed by applying transformation based on the landmark point and the target point.

Figure 6:
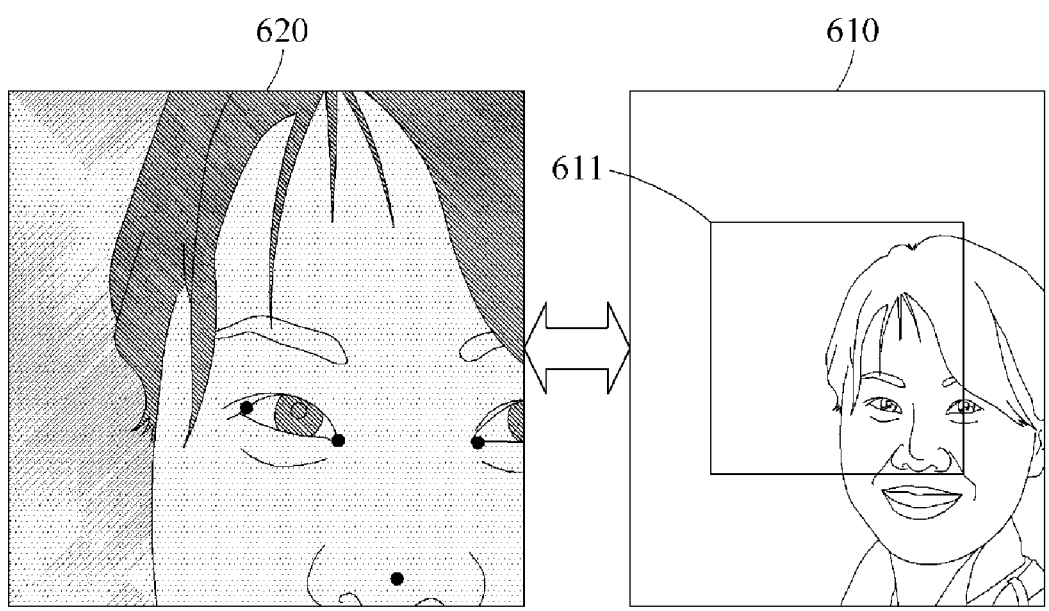
FIGS. 6 and 7 illustrate examples of an image matching result.
Figure 7:
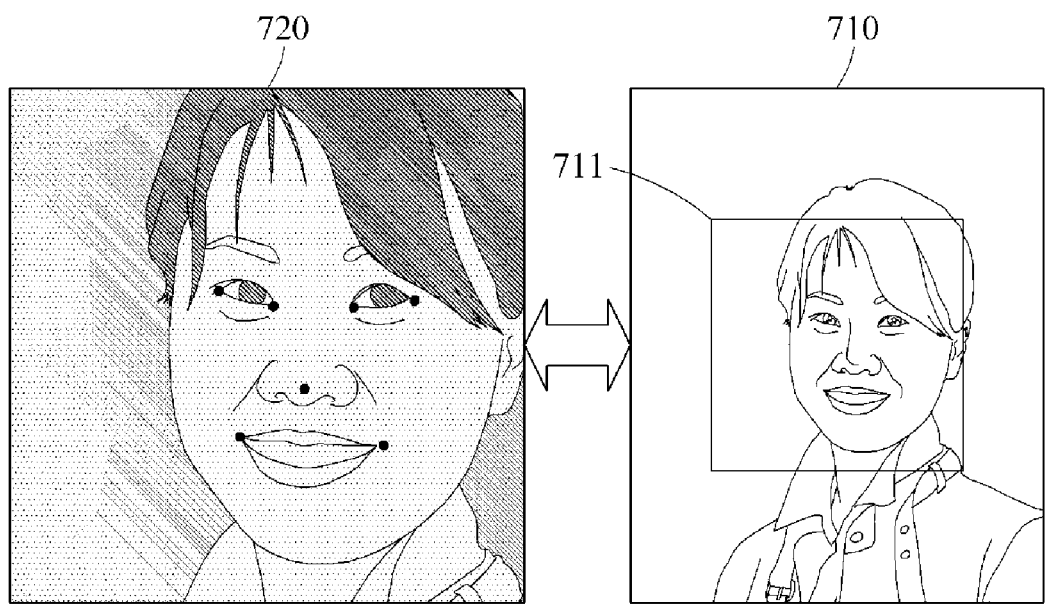

FIGS. 6 and 7 illustrate examples of an image matching result.

FIG. 6 illustrates an example in which a portion of a landmark of an object is present in a predetermined (or, alternatively, desired) region 611 in a color image 610 captured by an image matching device. Since a FOV of an IR image 620 is less than that of the color image 610, only a portion of the object may be present in the IR image 620. In an example, in response to only the portion of the landmark being identified in the desired region 611 of the color image 610, the image matching device may determine a target point corresponding to the identified landmark in the IR image 620. Thus, the image matching device may accurately determine a feature point corresponding to the landmark based on a landmark point of the color image 610 although only the portion of the landmark is present in the FOV of the IR image 620.

FIG. 7 illustrates an example in which a plurality of landmarks is present in a predetermined (alternatively, desired) region 711 in a first image 710 captured by an image matching device. The image matching device extracts a landmark patch for each of a plurality of landmarks of an object from the first image 710. The image matching device extracts a target patch for each of the plurality of landmarks from a second image 720. The image matching device determines a target point corresponding to the landmark point for each of the plurality of landmarks.

Without being limited thereto, the image matching device determines a point corresponding to a remaining landmark in the second image 720 based on the target point associated with one of the plurality of landmarks in response to the plurality of landmarks being detected with respect to the object from the first image 710. Thus, although target points with respect to entire landmarks of the second image 720 are not determined, the image matching device may estimate a feature point corresponding to the remaining landmark based on target points determined with respect to a portion of landmarks.

In an example, the image matching device may calculate a distance between a landmark point with respect to a landmark in a first image and a target point corresponding thereto in a second image. The image matching device may estimate a location of a feature point in the second image by reflecting the calculated distance to a feature point in the first image corresponding to a remaining landmark.

In an example, the image matching device may determine a corrected location of a feature point corresponding to a remaining landmark in a color image as a location of a feature point in an IR image, based on a distance calculated with respect to a landmark in the color image. In response to pixels in a desired region, for example, a region corresponding to a FOV of the IR image, in the color image being simply mapped to pixels in the IR image based on a one-to-one correspondence, for example, pixel-by-pixel, a disparity may occur between an object present in the color image and the object present in the IR image based on a relative location between the object and the image matching device. Therefore, a pixel determined as a feature point in the IR image may have an error. The image matching device may accurately determine a feature point in the IR image by correcting the disparity.

In an example, the image matching device may determine a target point of a second image based on a matching between a landmark patch and a target patch. Therefore, the image matching device may accurately determine a feature point of the second image compared to a case of simply transforming a pixel location of the first image to a pixel location of the second image.

Figure 8:
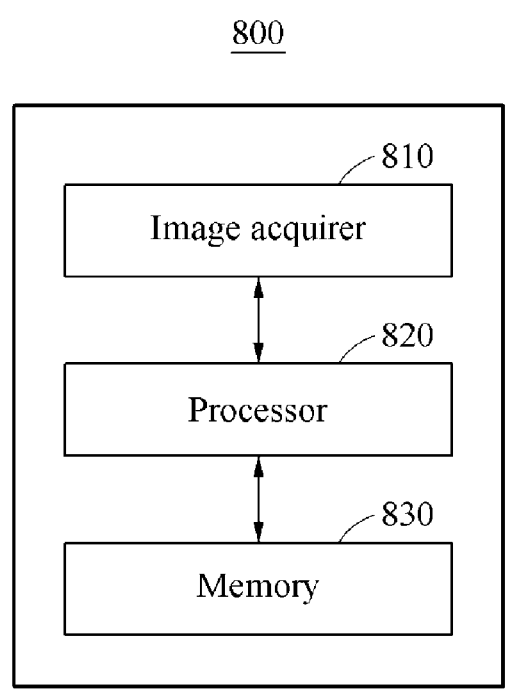
FIG. 8 is a diagram illustrating an example of an image matching device.

FIG. 8 is a diagram illustrating an example of an image matching device. In an example, the image matching device may be the image matching device discussed above in any or any combination of FIGS. 1 through 7, wherein examples are not limited thereto.

Referring to FIG. 8, an image matching device 800 includes an image acquirer 810 and a processor 820. Also, the image matching device 800 further includes a memory 830. The processor 820 and memory 830 are also respectively representative of one or more processors 820 and one or more memories 830.

The image acquirer 810 acquires a first image and a second image. The image acquirer 810 includes a first image sensor and a second image sensor. The first image sensor acquires the first image, and the second image sensor acquires the second image. The first image sensor and the second image sensor may have different sensor characteristics, for example, may have different FOVs. Wavelength bands, for example, a visible band and an IR band, in which the first image and the second image are captured respectively, may be different. Also, points in times at which the first image and the second image are captured, respectively, may be different. However, they are provided as examples only. Types of the first image and the second image may be identical. Alternatively, the points in times at which the first image and the second image are captured, respectively, may be identical.

The processor 820 extracts a landmark patch including a landmark point of an object from the first image and extracts a target patch corresponding to the landmark patch from the second image. The processor 820 determines a target point corresponding to the landmark point in the second image based on a matching between the landmark patch and the target patch. However, an operation of the processor 820 is not limited thereto, and the processor 820 may perform the operations described above with reference to FIGS. 1 through 7. Also, without being limited to the description made above with reference FIGS. 1 thorough 7, the operations may be performed in various orders in various examples.

The memory 830 temporally and semi-permanently stores data used to perform the image matching method. For example, the memory 830 stores images generated during an image matching process. Also, the memory 830 stores models, for example, an object model and the like, that are used for recognition and parameters.

In an example, the image matching device 800 does not require a face detector and a face feature point detector for each image type. If a type of an image is different, for example, if the image is a color image or an IR image, the image matching device 800 detects a feature point with respect to the different type of the image using a feature point detector developed with respect to a single image.

Also, the image matching device 800 performs a matching with respect to a partial region that is expected as a feature point and thus may save computing power. Also, the image matching device 800 may reduce an amount of time used for matching.

Figure 9:
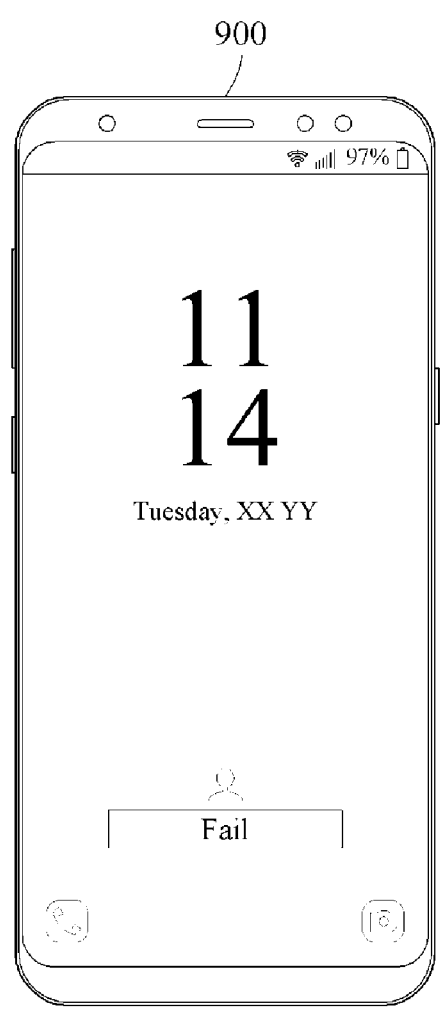
FIGS. 9 and 10 illustrate examples of applying an image matching device.
Figure 10:
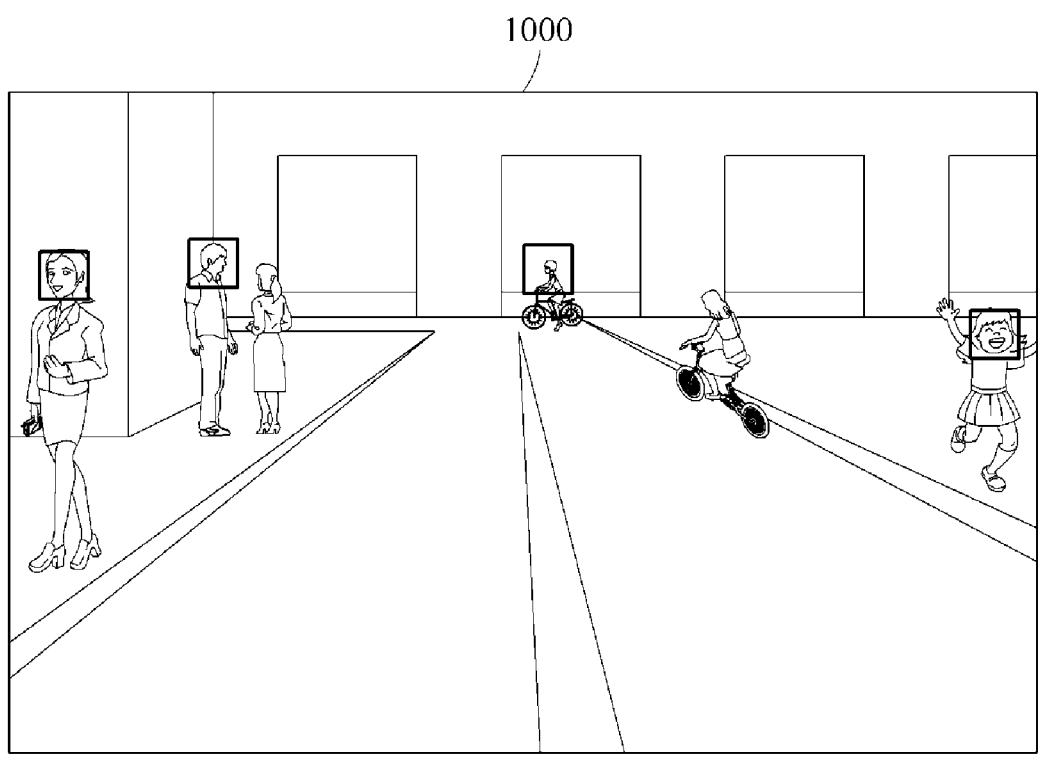

FIGS. 9 and 10 illustrate examples of applying an image matching device. In an example, the image matching device may be the image matching device discussed above in any or any combination of FIGS. 1 through 8, wherein examples are not limited thereto.

Referring to FIG. 9, the image matching device is representative of, or applied to, a device 900, for example, a smartphone, including a multi-image sensor. For example, the image matching device may be representative of, or applied to, an authentication system using a multi-modal input image. The multi-image sensor may detect either one or both of color images and IR images.

Referring to FIG. 10, the image matching device may be representative of, or applied to, a security management system 1000, for example, a closed-circuit television (CCTV). For example, the image matching device may accurately determine a feature point of an object, complexly using a first image and a second image although an amount of light is limited, such as night.

The image matching device 800, the image acquirer 810, the processor 820, the memory 830, the device 900, and other components described herein with respect to FIGS. 1 through 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image matching method, comprising:
   photographing, by a first image sensor, an object to acquire a first image;
   photographing, by a second image sensor, the object to acquire a second image;
   determining a landmark point of the first image based on a neural network model stored in a memory;
   extracting, from the first image of the object, a landmark patch including the landmark point of the object;
   extracting, from the second image of the object, a target patch corresponding to the landmark patch, wherein a size of the target patch is greater than a size of the landmark patch;
   determining a target point in the second image corresponding to the landmark point based on a matching between the landmark patch extracted from the first image and the target patch extracted from the second image;
   recognizing the object, in the second image, based on the target point; and
   authenticating a user based on the recognized object,
   wherein the landmark point comprises both ends of an eye of the user.

2. The image matching method of claim 1, wherein the photographing by the first image sensor comprises acquiring, using a color image sensor, a color image as the first image; and
   the photographing by the second image sensor comprises acquiring, using an infrared (IR) image sensor, an IR image as the second image.

3. The image matching method of claim 1, further comprising:
   determining, based on the target point, whether the object is an anatomical structure of the user.

4. The image matching method of claim 1, further comprising:
   allowing access, through the user interface of a device, to one or more features of the device in response to the object being determined to be either one or both of a live anatomical structure and a recognized user.

5. The image matching method of claim 1, wherein the extracting of the target patch comprises determining the target patch in the second image based on a location of the landmark patch in the first image.

6. The image matching method of claim 1, wherein the extracting of the target patch comprises extracting the target patch in response to the landmark point being detected in a determined region of the first image.

7. The image matching method of claim 1, wherein the determining of the target point comprises:
retrieving, from the target patch, a partial region that matches the landmark patch; and
determining a center point of the retrieved partial region as the target point.

8. The image matching method of claim 1, wherein:
the first image is a color image and the second image is an infrared (IR) image; and
the extracting of the landmark patch comprises:
selecting a channel image from the first image; and
extracting the landmark patch from the selected channel image.

9. The image matching method of claim 1, wherein:
the first image includes a plurality of channel images; and
the extracting of the landmark patch comprises extracting the landmark patch from a channel image with a minimum wavelength difference between the channel image and the second image among the plurality of channel images.

10. The image matching method of claim 1, wherein:
the extracting of the landmark patch comprises extracting the landmark patch from the first image for each of a plurality of landmarks of the object,
the extracting of the target patch comprises extracting the target patch from the second image for each of the plurality of landmarks, and
the determining of the target point comprises determining the target point corresponding to the landmark point for each of the plurality of landmarks.

11. The image matching method of claim 1, wherein the determining of the landmark point comprises:
determining an object region corresponding to the object in the first image;
identifying the landmark point of the object in the object region.

12. The image matching method of claim 1, further comprising:
matching the first image and the second image based on the landmark point of the first image and the target point of the second image.

13. The image matching method of claim 1, further comprising:
preprocessing the landmark patch and the target patch using a Gaussian filter; and
matching the preprocessed landmark patch and the preprocessed target patch.

14. The image matching method of claim 1, wherein the extracting of the target patch comprises determining the target patch in the second image based on a location of the landmark patch in the first image and a distance between an image matching device and the object.

15. The image matching method of claim 1, further comprising:
determining a point corresponding to a remaining landmark in the second image based on the target point associated with one of a plurality of landmarks of the object in response to the plurality of landmarks of the object being detected in the first image.

16. The image matching method of claim 1, further comprising:
verifying a liveness of the object, in the second image, based on the target point.

17. A non-transitory computer-readable storage medium storing instructions that, when executed by a processor, cause the processor to perform the method of claim 1.

18. The image matching method of claim 1, wherein the landmark point further comprises either one of both ends of a mouth and a tip of a nose of the user.

19. The image matching method of claim 6, wherein the extracting of the target patch comprises determining the determined region based on a difference between a field of view (FOV) of a first image sensor used to capture the first image and an FOV of a second image sensor used to capture the second image.

20. The image matching method of claim 7, wherein the retrieving of the partial region comprises:
calculating a similarity level between the landmark patch and each of a plurality of partial regions of the target patch; and
determining a partial region with a highest calculated similarity level among the plurality of partial regions as the partial region that matches the landmark patch.

21. The image matching method of claim 20, wherein the calculating of the similarity level comprises calculating a correlation level between values of pixels included in each of the plurality of partial regions of the target patch and pixels included in the landmark patch as the similarity level.

22. An image matching device, comprising:
a first image sensor configured to capture an object for acquiring a first image;
a second image sensor configured to capture the object for acquiring a second image;
a memory configured to store a neural network model; and
one or more processors configured to:
determine a landmark point of the first image based on the neural network model stored in the memory,
obtain the first image of the object and the second image of the object;
extract, from the first image, a landmark patch including the landmark point of the object,
extract, from the second image, a target patch corresponding to the landmark patch,
determine a target point in the second image corresponding to the landmark point based on a matching between the landmark patch extracted from the first image and the target patch extracted from the second image,
recognize the object, in the second image, based on the target point, and
authenticate a user based on the recognized object, wherein the landmark point comprises both ends of an eye of the user, and wherein a size of the target patch is greater than a size of the landmark patch.

23. A processor-implemented image matching method, comprising:
photographing, by a first image sensor, an object to acquire a first image;
photographing, by a second image sensor, the object to acquire a second image;
determining a first feature point of the first image based on a neural network model stored in a memory;

extracting, from the first image of the object, a first patch including the first feature point of the object;

extracting, from the second image of the object, a second patch based on the first patch, wherein a size of the second patch is greater than a size of the first patch;

determining a second feature point in the second patch, based on a matching between the first patch extracted from the first image and the second patch extracted from the second image;

identifying the object or verifying an identity of the object based on the second feature point and the second image; and authenticating a user based on the identified object or the verified identity of the object, wherein the first feature point comprises both ends of an eye of the user.

* * * * *